May 1, 1956 — A. KREIDLER — 2,743,783
MOUNTING OF MOTOR CYCLE DRIVING UNIT
Filed Dec. 10, 1951 — 3 Sheets-Sheet 1

INVENTOR
ALFRED KREIDLER
BY
ATTY

May 1, 1956            A. KREIDLER            2,743,783
MOUNTING OF MOTOR CYCLE DRIVING UNIT
Filed Dec. 10, 1951                                3 Sheets-Sheet 2
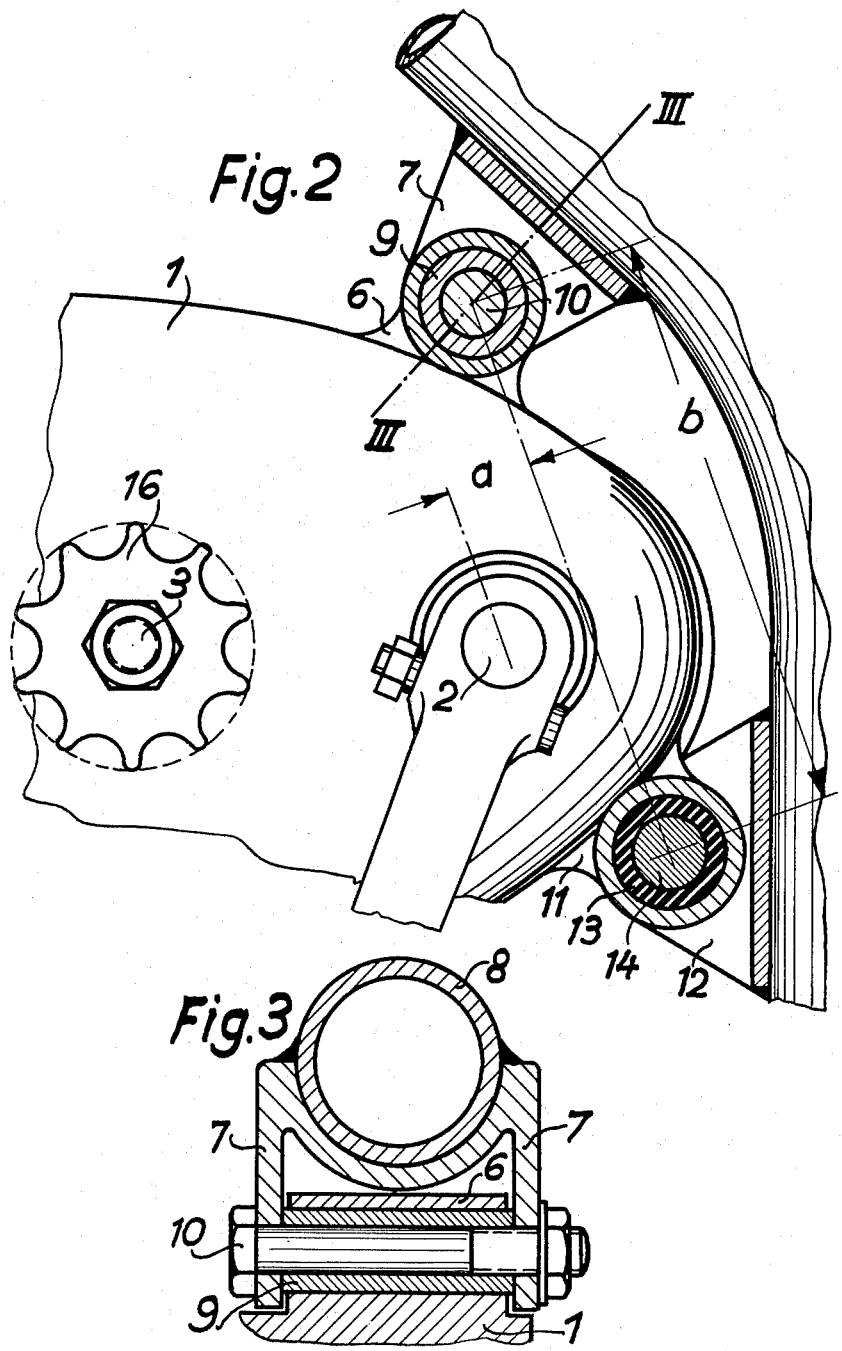
INVENTOR
ALFRED KREIDLER
BY Kuehinhechi
ATT'Y May 1, 1956  A. KREIDLER  2,743,783
MOUNTING OF MOTOR CYCLE DRIVING UNIT
Filed Dec. 10, 1951  3 Sheets-Sheet 3

INVENTOR
ALFRED KREIDLER
BY *Kreidler*
ATTY

United States Patent Office 2,743,783
Patented May 1, 1956

2,743,783

MOUNTING OF MOTOR CYCLE DRIVING UNIT

Alfred Kreidler, Stuttgart, Germany

Application December 10, 1951, Serial No. 260,834

Claims priority, application Germany December 18, 1950

7 Claims. (Cl. 180—33)

This invention relates to motor cycles and more especially to means for transmitting forces generated by the motor, and the pedal crank bearing and the power transmitting gear to a closed frame.

It is an object of this invention to provide means whereby these parts are mounted on the frame in such a manner that the forces acting on the frame during pedalling and driving are taken up by them in a more effective way than was hitherto possible.

In a well known type of motor cycle the motor, the pedal crank bearing and the power transmitting gear are combined structurally to form a block which is mounted on the frame in such manner as to be readily disengaged from it. In this block a driving shaft common to the motor drive and the pedal crank drive transmits the power to the rear wheel by a chain. In mounting this block on the frame difficulties arise owing to the fact that three different moments have to be taken up. Pedalling produces various moments around the longitudinal axis of the block. The one-sided chain pull produces a moment tending to turn the block around its vertical axis. The oscillations set up by the motor and the chain pull generate further moments about the transversal axis. Obviously all these moments are due to influence the security of driving as well as the life of the cycle.

According to this invention, now, all these moments are taken up by the frame in the following manner: an upper mounting support rigidly takes up the moments produced around the longitudinal block axis by pedalling, while the further moments generated by the motor and the chain pull around the transversal axis of the block are taken up by a lower mounting support.

In order to provide that the oscillations generated by the motor drive be taken up and that jerky stresses acting on the chain be avoided, it is advantageous to insert an elastic element in the means of support which are designed to take up the moments around the transversal axis.

In order to keep the totality of the moments as low as possible, I have found it advantageous to make the vertical distance between the pedal crank shaft and the line connecting the two supports as small as possible and in any case smaller than the distance between the two supports.

In order, further, to keep the movements of the pedal crank axis resulting from the inavoidable oscillations of the block in or near a horizontal plane, where they are less disturbing for the cyclist, it has been found preferable to so locate the first support, that the vertical extending from it towards the horizontal connecting the driven shaft and the pedal crank shaft pass as close as possible to said latter shaft.

For practical reasons, however, it may become advisable to arrange the upper mounting support or an additional third support on or near the motor cylinder.

In the drawings affixed to this specification an embodiment of the invention is illustrated diagrammatically by way of example.

In the drawings

Fig. 2 shows part of the same view on a materially greater scale, partly in section.

Fig. 3 is a cross-section of the upper mounting support on the line III—III in Fig. 2.

Figure 1:
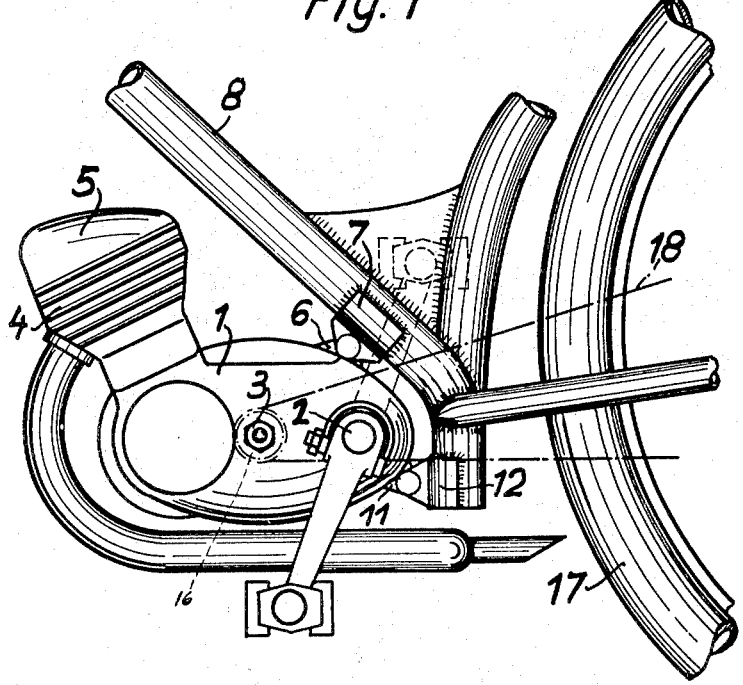
Fig. 1 is a side elevation of a first embodiment of the invention.

Referring to the drawings, 1 is a motor housing enclosing both the pedal crank and driving gear mechanism, or driving unit, or driving block, 2 is the pedal crank shaft and 3 the shaft of the step-down chain sprocket 16. This chain sprocket 16 is coupled with rear wheel 17, which is rotatably mounted in the rear wheel part of the cycle frame, by means of a chain 18 indicated in the drawing by a dash-dot line. The driving gear proper and its connection with the pedal crank do not form part of the invention and therefore are not shown in the drawings. The motor cylinder 4 is mounted on top of the housing and 5 is the cylinder head. An eye 6 is fixed to the housing 1 somewhat above the pedal crank shaft 2 (Figs. 2 and 3). This eye is inserted between the two halves of the bracket 7 welded to the down tube 8 of the frame and is secured therein on a spacer sleeve 9 by means of a bolt 10. Another eye 11 is located at a lower level and nearer to the rear wheel 17 than the upper support and in a vertical plane extending to the rear of the pedal axle 2. The housing or driving unit 1 is here attached to the down tube 8 by means of a bolt 14 supported in rubber sleeves 13 extending across another bracket 12 welded to the frame.

All these parts are so arranged that the vertical distance $a$ (Fig. 2) between the pedal crank shaft 2 and the line connecting the centers of the two eyes 6 and 11 is as small as possible and in any case smaller than the distance between these two centers. The pedal crank axis may even be located right on this line of connection.

With reference to Figs. 1, 2 and 3 of the drawings, the first support 6, 7, 9, 10 takes up in a rigid manner the moments arising around the longitudinal and the vertical axes, including the stresses caused by one-sided pull of the chain 18, so that the block is unable to assume an oblique position on the frame during operation. It is free to oscillate only in the vertical main plane. The moments arising around the transversal axis, which is thus left free by the first mounting support, are taken up in an elastic manner by the lower mounting support 11—14 in such manner that the oscillations of the motor are damped and jerky stresses of the chain during starting and stopping are avoided. Thus, by the provisions of these two supports, the upper rigid and the lower resilient or elastic, all of the movements around the longitudinal and vertical axes of the driving unit or block 1 are taken up in a superior manner, i. e. the one-sided pull stresses from the chain 18 arranged on one side of the cycle cannot displace this driving block with respect to the cycle frame or bend or deform the latter, while simultaneously the oscillations or vibrations of the motor are damped by the elastic mounting. The greatest one-sided stresses in the cycle are occurring during pedaling, because the power of the cyclist's legs is exerted non-uniformly on the pedal shaft 2 and considerable bending stresses act on the driving block 1 and are transmitted to the cycle frame during such operation.

Figure 4:
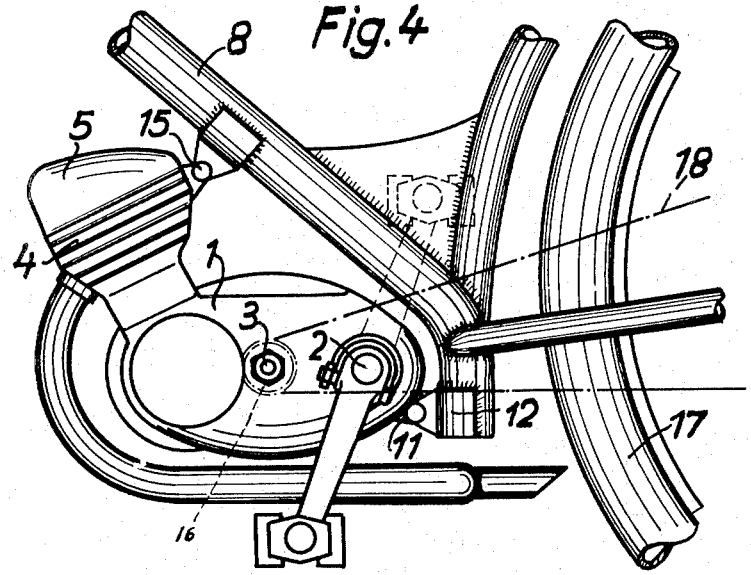
Figs. 4 and 5 are side elevations of further embodiments of the present invention.

In some cases it may be advisable or necessary to provide the upper of the two mounting supports of the driving unit or block 1 closer to the motor cylinder 4 or even on this cylinder itself. Such construction is illustrated in the embodiment of Fig. 4, in which the upper and rigid support on the cylinder 4 is denoted by 15.

Figure 5:
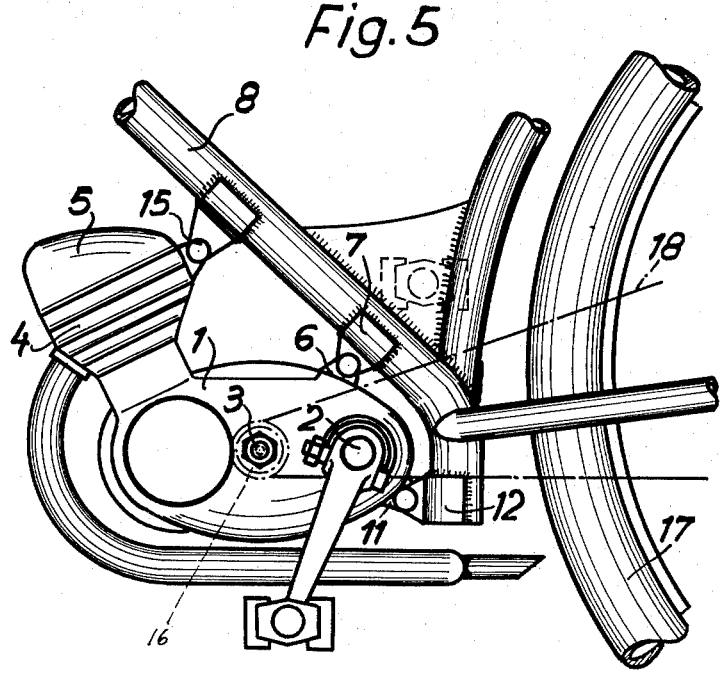

In other cases, three supports for the driving unit or block may be provided. Thus, Fig. 5 shows an embodiment of the invention, in which two upper rigid supports at 6 and 15 and one lower elastic support at 11 serve to mount the driving unit or block 1 in or on the cycle frame. While the supports at 6 and 11 correspond to those in Figs. 1, 2 and 3, the support 15 is the same as that in Fig. 4.

I wish it to be understood that I do not desire to be limited to the details hereabove described and shown in the drawings, for obvious modifications will occur to a person skilled in the art.

I claim:

1. A motor cycle comprising in combination, a wheeled frame, a down tube forming part of said frame a rear wheel arranged in said frame, a driving unit separate from said frame comprising a motor, a chain sprocket and a pedal axle, a chain coupling said unit with said rear wheel and a pair of mounting supports fixed to said down tube, one of said supports being located in a plane above the horizontal plane containing said pedal axle, the other support being arranged at a lower level and nearer to the rear wheel than the first and in a vertical plane extending to the rear of said pedal axle, the two supports being so arranged as to be capable of taking up the moments arising around the longitudinal axis of the driving unit, those caused by the one-sided chain pull around a vertical axis and also the moments arising around the transverse axis of said driving unit.

2. The motor cycle of claim 1, in which the two mounting supports are so located on the frame that the distance between the pedal axle and a line connecting the centers of the two supports is shorter than the distance between the two centers.

3. The combination of claim 1, in which an elastic suspension is provided for the lower mounting support.

4. The combination of claim 1, in which the upper mounting support is so arranged that the vertical extending from it passes between the pedal crank shaft and the driven shaft.

5. The combination of claim 1, in which the upper mounting support is arranged right on the motor cylinder.

6. The combination of claim 1, in which a third mounting support is provided right on the motor cylinder.

7. A motor cycle comprising in combination, a wheeled frame, a rear-wheel part in said frame, a down tube forming part of said frame a rear wheel arranged for rotation in said frame, a chain sprocket operatively connected with the rear-wheel, a pair of mounting supports fixed to said down tube frame part, a driving block which comprises a motor, a chain sprocket and a pedal axle and is separate from said frame, being fixed to said two mounting supports, one of said supports being located above the horizontal plane containing said pedal axle, the other support being arranged at a lower level than said first support and in a vertical plane extending to the rear of said pedal axle, said supports being so arranged as to be capable of taking up the moments arising around the longitudinal axis of the driving block, those caused by the one-sided pull of a chain coupling said two sprockets, around the vertical axis, and also the moments arising around the transverse axis of said driving block.

References Cited in the file of this patent

UNITED STATES PATENTS

| 570,440 | Pennington | Oct. 27, 1896 |
| 928,928 | Belz | July 27, 1909 |

FOREIGN PATENTS

| 980,195 | France | Dec. 20, 1950 |
| 474,807 | Great Britain | Nov. 8, 1937 |
| 598,754 | Great Britain | Feb. 25, 1948 |